(12) United States Patent
Akselrod et al.

(10) Patent No.: US 9,924,313 B1
(45) Date of Patent: Mar. 20, 2018

(54) LOCATION BASED GENERATION OF PERTINENT INFORMATION

(71) Applicant: International Business Machines Corporation, Armonk, NY (US)

(72) Inventors: Ben Z. Akselrod, Givat Shmuel (IL); Jeremy A. Greenberger, Raleigh, NC (US); Kaylyn C. Sigler, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/440,031

(22) Filed: Feb. 23, 2017

(51) Int. Cl.
*H04W 24/00* (2009.01)
*H04W 4/02* (2009.01)
*H04W 4/04* (2009.01)

(52) U.S. Cl.
CPC ............. *H04W 4/021* (2013.01); *H04W 4/04* (2013.01)

(58) Field of Classification Search
CPC ................................ H04W 4/021; H04W 4/04
USPC ........ 455/418–422.1, 456.1–457, 552.1, 466
See application file for complete search history.

(56) References Cited

U.S. PATENT DOCUMENTS

| | | | |
|---|---|---|---|
| 5,805,167 A | 9/1998 | van Cruyningen | |
| 6,476,834 B1 | 11/2002 | Doval et al. | |
| 8,326,328 B2* | 12/2012 | LeBeau | G10L 15/265 455/404.1 |
| 8,521,186 B2* | 8/2013 | Fitchett | H04L 29/06027 455/404.2 |
| 8,874,129 B2* | 10/2014 | Forutanpour | G06F 3/04883 455/456.1 |
| 9,244,610 B2 | 1/2016 | Kushler et al. | |
| 2004/0006475 A1 | 1/2004 | Ehlen et al. | |
| 2004/0107072 A1* | 6/2004 | Dietrich | G01C 21/206 702/153 |
| 2005/0256782 A1* | 11/2005 | Sands | G06Q 10/087 705/26.41 |
| 2008/0248815 A1* | 10/2008 | Busch | H04W 4/02 455/456.5 |
| 2009/0259691 A1* | 10/2009 | Tanskanen | G06F 1/3228 |
| 2009/0319181 A1* | 12/2009 | Khosravy | G01C 21/20 701/532 |
| 2011/0282901 A1* | 11/2011 | Marks | G01S 5/0236 707/769 |
| 2011/0313768 A1* | 12/2011 | Klein | G06F 3/017 704/251 |
| 2014/0108927 A1* | 4/2014 | Vaidya | G06F 1/1694 715/708 |

(Continued)

FOREIGN PATENT DOCUMENTS

WO 2014008208 A2 1/2014

OTHER PUBLICATIONS

Montero et al., "Context-Based Gesture Recognition", CIARP 2006, LNCS 4225, 2006 © Springer-Verlag Berlin Heidelberg 2006, pp. 764-773.

*Primary Examiner* — Babar Sarwar
(74) *Attorney, Agent, or Firm* — Walter L. Rudberg; A. Imtiaz Billah

(57) ABSTRACT

Embodiments of the present invention provide a method and system for generating and delivering pertinent information to a user based on a user's location. Initially, a specific trigger and location of a device are identified. A specific action to perform is determined based on the location the computing device, a set of rules, and the identified specific trigger. The action is then performed.

18 Claims, 5 Drawing Sheets

(56) References Cited

U.S. PATENT DOCUMENTS

2015/0065171 A1* 3/2015 Huilgol ................. H04W 4/04
  455/456.3
2016/0094953 A1   3/2016 Russ et al.
2017/0116651 A1* 4/2017 Greenberger ...... G06Q 30/0281

* cited by examiner

LOCATION BASED GENERATION OF PERTINENT INFORMATION

BACKGROUND

The present invention relates generally to the field of mobile computing, and more particularly to generating and delivering pertinent information to a user based on a user's location.

Communication through a network has become an essential means of communication for individuals, families, and organizations. The Internet is a global network connecting countless computing devices, using a client-server style architecture. The Internet allows computing devices to send and receive data. Generally, a user accesses the Internet through an Internet Service Provider ("ISP") or a local area network ("LAN") connection. Routers and switches direct data traffic between the various ISPs. Electronic devices such as smart phones and personal computers, and the like, often have a means of connecting to the Internet which allows users to easily exchange data over the Internet. A device's access to the Internet is limited by the maximum bandwidth allowed by the ISP.

Advances in electronic technology allow for near instantaneous communication and data exchange, while leading to ever smaller devices. Many persons carry one or more mobile computing devices with them throughout their daily activities, for example, to keep in contact with others, to provide information, used as entertainment, etc. Mobile computing devices provide a user with access to computing capabilities even as the user moves about to various locations. Therefore, it is desirable to quickly receive specific information pertinent to a user's location. Specifically, by utilizing a communication network and a user's mobile computing device, a user of such devices can access pertinent content and services directly on the user's mobile device, based on the location of the user.

SUMMARY

According to an aspect of the present invention, a method for generating and delivering pertinent information to a user based on a user's location, the method comprising: (not necessarily in the following order): (i) identifying by one or more processors, a specific trigger based at least in part on a location of the computing device; (ii) determining, by one or more processors, an action to perform based on the zone the computing device is located, a set of rules, the identified specific trigger, and the received request; and (iii) performing, by one or more processors, the determined action, wherein the action comprises at least one of the following: displaying a set of information on the computing device; displaying directions on a map; and transmitting a notification to a second computing device.

Another embodiment of the present invention provides a computer program product for generating and delivering pertinent information to a user, based on the method described above.

Another embodiment of the present invention provides a computer system for generating and delivering pertinent information to a user, based on the method described above.

DETAILED DESCRIPTION

Mobile computing devices have become an essential part of daily life. The small size of computing devices allows them to be easily portable. Advances in electronic technology allow for near instantaneous communication and data exchange. Many devices possess 'smartness' features which enable such devices to receive and send information over a network. Additionally, many smart devices provide a user with access to computing capabilities even as the user moves about to various locations.

Embodiments of the present invention provide systems and methods to derive directly and/or indirectly a user's location user (based on the location of a mobile computing device associated with the user), in order to determine a specific action to perform based on the location of the user.

Embodiments of the present invention provide systems and methods to automatically utilize the location of a user, to intuitively determine pertinent and applicable information for a user, without the need for the user to request and/or search for the specific pertinent information. Further, embodiments of the present invention provide systems and methods to determine what action should be taken when the user makes such a request.

Embodiments of the present invention provide systems and methods to automatically utilize a mobile device by receiving and analyzing inputs for various parameters, and then accordingly determine a specific action to perform and/or specific information to provide to the user (e.g., on a display). Embodiments of the present invention determines a specific action pertinent to the user that directly and/or indirectly relates to the location of the user.

Embodiments of the present invention provide a system and method that may self-learn, based on a user's pattern, and/or specific actions to take based on a user's location.

Embodiments of the present invention provide a system and method that may through analytic analysis to generate model mapping from gestures to specific actions, dependent on a user's location within a larger building.

Embodiments of the present invention recognize the need for more effective location based assistance. Sometimes, generating and delivering pertinent information to a user based on a user's location, may not be helpful. In other instances, embodiments of the present invention recognize that certain actions such as sending an alert to a $3^{rd}$ device may or providing a user with a specific type of information, may not be what the user needs. Therefore, embodiments of the present invention provide solutions to identify common actions of the user and predicts, based at least in part on one's location and historic data, to generate and deliver information to a user based on a user's location. In this manner, as discussed in greater detail below, embodiments of the present invention can be used to predict exact actions to perform without a user having to manually identify and input a specific action to perform.

Figure 1:
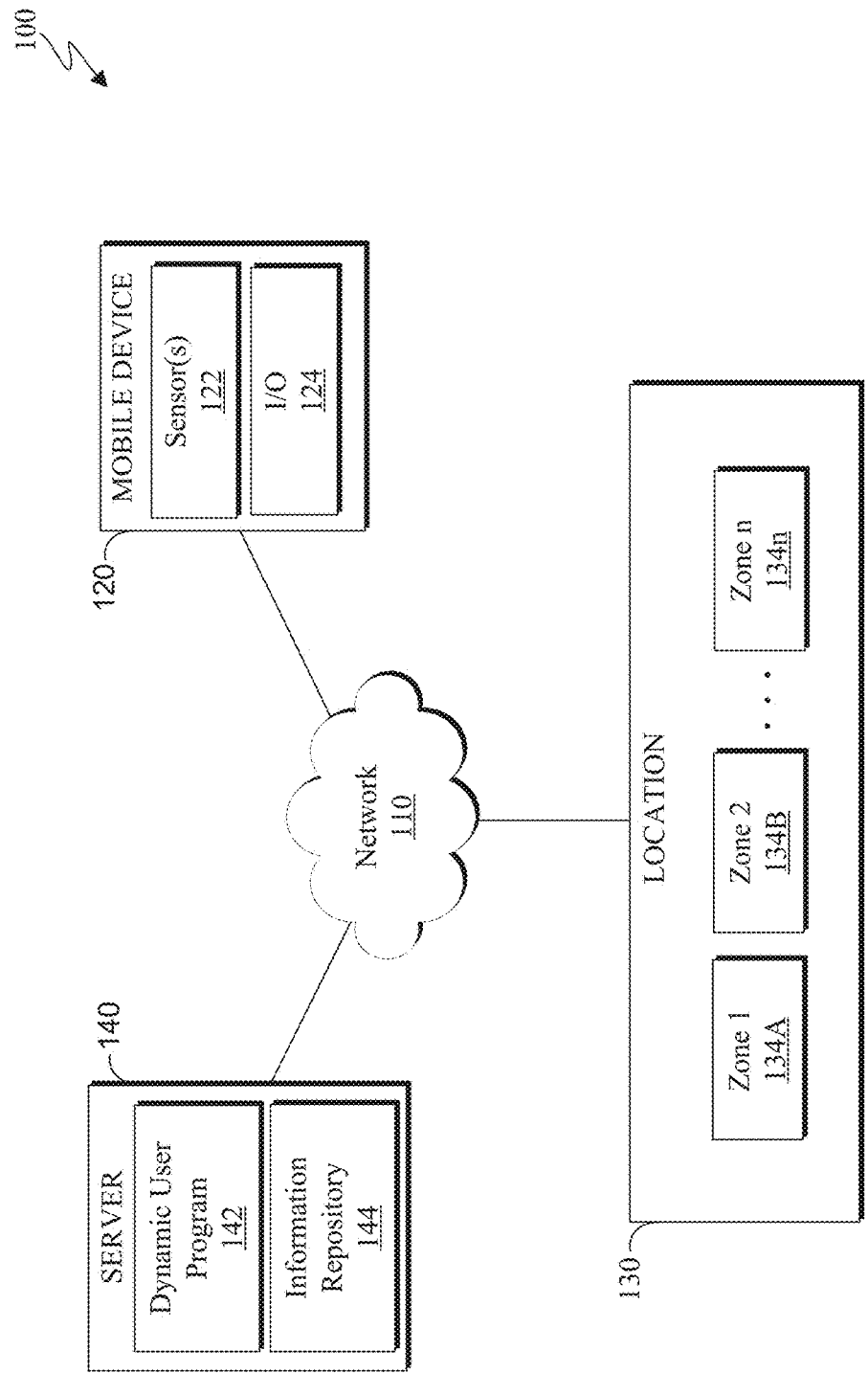
FIG. 1 is a functional block diagram illustrating a data processing environment, in accordance with an embodiment of the present invention.

The present invention will now be described in detail with reference to the Figures. FIG. 1 is a functional block diagram illustrating a data processing environment ("environment"), generally designated, environment 100, in accordance with an embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

In the depicted embodiment, environment 100 includes mobile device 120, location 130, server 140 all interconnected over network 110. Mobile device 120, location 130, server 140 may include internal and external hardware components, as depicted and described in further detail with respect to FIG. 4.

Network 110 may be a local area network ("LAN"), a wide area network ("WAN"), such as the Internet, the public switched telephone network ("PSTN"), a mobile data network (e.g., wireless Internet provided by a third or fourth generation of mobile phone mobile communication), a private branch exchange ("PBX"), any combination thereof, or any combination of connections and protocols that will support communications mobile device 120, location 130 and server 140.

Mobile devices 120 may be any electronic computing device capable of communication and data exchange, and capable of communicating with network 110. Embodiment 100 depicts only 1 mobile device (mobile device 120), however, it is to be understood that any number and type of mobile device may be utilized and connected to network 110. Mobile device 120 may contain sensor 122 and I/O 124, discussed in greater detail below.

Mobile devices 120 include, but is not limited to, cellular phones, smart phones, mobile phones, Wi-Fi phones, wearable computing devices, laptop computers, tablet computers, desktop computers, handheld computers, netbooks, personal organizers, e-reading devices, and the like. It is to be understood that while the concepts included herein are presented in the context of a mobile device, the concepts disclosed herein may be applied in other contexts as well if the appropriate hardware is available. For example, in lieu of a mobile device, a wearable device (including, but not limited to: a watch, ring, necklace, bracelet or other wrist worn device) may be utilized.

Mobile device 120 may be a standalone device and/or a device which leverages another device. For example, mobile device 120, may be a standalone smart phone. Additionally, and or alternatively, mobile device 120 may represent a device which lacks its own ability to connect to network 110. Therefore, mobile device 120 has the ability to be connected to and/or paired with a larger computing device (e.g., a device with the ability to process data from network 110, possess a user interface and/or possess I/O 124 functionality). For example, mobile device may have the ability to leverage one or more components of another device which can access network 110. Mobile device 120 may detect various inputs and capable of transmitting and receiving data from network 110. In an embodiment, mobile device 120 may leverage other devices external to the mobile device, such as a mobile phone or a personal computer. For example, mobile device 120 may request information through dynamic user program 142, based on the location of mobile device 120.

Mobile device 120 may be associated with a user (not shown). For example, a user who has the ability, may perform various functions and tasks on mobile device 120. It is noted, that performing the same input on mobile device 120 may generate a different output depending on the location, learned patterns, and/or user established rules. Similarly, depending on a user's location and/or an identified input, the output may vary. Such input/output may be acted by a graphical user interface.

Mobile devices 120 may include a one or more of sensors, denoted as sensor 122. Sensor 122 may interact with one or more other sensors and/or mobile devices. One of ordinary skill in the art will appreciate that any arrangement of input sensors may be included on mobile device 120 to receive commands from a user. Sensors 122 for the mobile device 120 may include, but are not limited to, a location determining sensor (e.g., GPS), proximity sensors, light sensors, thermometers, atmospheric sensors, accelerometers, gyroscope, altimeter, barometer, compass, proximity sensors, motion detectors, touch sensors, or the like. One skilled in the art may see, any sensor or sensor combination in mobile device 120 may be used without deviating from the invention, as sensor 122 permit user to interact with mobile device 120. Sensor 122 may detect movements as a function of time. A gesture may be made up of varying positions expressed as a unique, identifiable, pattern over an interval of time, thereby allowing a variety of gesture movements, each with a unique repeatable pattern of movement. For example, a handshake is a specific "up and down" motion over a short period of time. Additionally, sensor 122 may detect instantaneous motion. A gesture may encompass a specific movement given at an instant in time. For example, a specific movement, or orientation.

Sensor 122 senses, detects and/or measures various movements and gestures of the user of mobile device 120. Typically, a gesture is the actual movement of mobile device or a movement that user conducts on mobile device 120. Exemplary gestures may include but not limited to, tilting, shaking, tapping, and specific directional moving, as well as complex variations of the above. In an exemplary embodiment, dynamic user program 142 or an application on mobile device 120 determines if the various gestures detected by sensor 122 are predetermined gestures. Additionally, sensor 122 may also detect orientation and movements of mobile device 120.

Sensor 122 may include sensing techniques including, but not limited to processing of signals representing geographic locations in order to detect and/or infer one or more conditions under which dynamic user program 142 may determine pertinent information to display on mobile device 120 to user. It is noted that a geographic location may include any type of bonded area of interest meaningful to a user (via mobile device 120) and/or dynamic user program 142. A geographic location may be distinguished by one or more zones via a physical or virtual boundary line, which may or may not correspond to and/or overlap with a physical location and/or structure (e.g., sections of a restaurant, individual shops in a large mall, sections of a particular shop, portions of a mall, terminals at an airport, a cubical in an office building, a covered area at a park, etc.). In some exemplary geographic locations, a user may define one or more zones within a geographic area. Such zones may be of a different size and could overlap.

In an embodiment sensor 122, may obtain and/or receive estimates of its exact geographic location using any one of several location tracking and/or location detecting techniques. For example, sensor 122 can interact with a location based device to obtain and/or receive a location of mobile device 120. For instance, sensor 122 may process signals from a satellite positioning system, global positioning system, communication with a location server through a wireless communication network (e.g., Wi-Fi nodes, communication antenna, etc.), wireless communication triangulation techniques, etc. It is noted that the aforementioned are intended for exemplary purposes only, and not limiting.

Sensors associated with mobile devices 120 may assist in determining location or a location change of mobile device 120. For example, sensor(s) 122 may determine a proximate position of mobile device within a location. Similarly, the location may be subdivided to contain one or more zones (see the discussion below regarding location 130). For instance, if the location is a restaurant, zone 1 may be the waiting room, zone 2 is the dining room and zone 3 is the restroom. Thus, in this scenario, sensor(s) 122 may be capable of detecting the position of mobile device 120 within each zone of the location.

Mobile devices 120 may include one or more means of input and output (I/O 124). For example, an exemplary input may be a user interface (not show). The user interface may include a graphical user interface. Mobile devices 120 may have a user interface allowing a user to establish rules and/or various inputs. For example, user interface may allow a user to establish a specific gesture to initiate dynamic user program. For instance, once I/O 124 detects the pre-programmed gesture, mobile device 120 sends a request for pertinent information based on user's location, as derived by sensor 122.

Mobile device 120 may be able to detect a gesture. For example, if the user interface is a touch screen, a predetermined gesture/symbol drawn on the touch screen by the user, may initiate dynamic user program 142. Alternatively and/or additionally, dynamic user program 142 may be initiated by triggering an icon. Mobile device 120 may analyzes data from sensor 122 to allow mobile device 120 to interact intelligently to specific user gestures. Utilizing at least one sensor 122, mobile device 120 (or dynamic user program 142) detects various gestures which correlate to specific predetermined functions.

Location 130 may represent any commercial, industrial, residential, education, and/or retail establishment. Location 130 may contain 1 or more zones. Each zone may refine the proximate location of mobile device 120. For example, if location 130 is a restaurant, zone 1 134A may be the waiting room, zone 2 134B is the dining room and zone 3 134C is the restroom. In another example, if location 130 is a college campus, zone 1 134A could be a quad, zone 2 134B could be a building with its own sub-zones for each room, or even areas of a room, etc. In another example, location 130 may be a shopping mall, where each zone (Zone 1 134A, Zone 2 134B, through Zone n 134*n*) is a retail store/restraint, and each zone may be made up of two or more sub-zones. For instance, if location 130 is a mall, zone 1 134A is a retail clothing store, then the retail clothing store may have sub-zones for men's clothing, woman's clothing, children's clothing, cashier, changing rooms. Alternatively, and or additionally, in that scenario, zone a 134A, of location 130, may be made up of only 1 zone.

In an exemplary embodiment (not shown in embodiment 100) location 130, may include a router, modem computer or other devices known in the art, which may assist dynamic user program 142 to derive a location of mobile device 120. Additionally, each zone within location 130 may include its own router, modem computer or other devices known in the art, which assists dynamic user program 142 to derive a location of mobile device 120. Such a device may be used as a standalone device or in combination with a sensor on mobile device in order to derive which zone mobile device is in, to enable dynamic user program 142 to predict an appropriate response to a user's request.

Location 130 may contain a private network (not shown in environment 100) which may assist dynamic user program 142 to derive a location of mobile device 120. For example, location 130, may include the private network of location 130 may be a computer network with a small geographic scope. Computer networks with a small geographic scope range from near field communication ("NFC") to LAN's. A computer network with a small geographic scope may have a connection to the Internet or other remote networks. The private network of location 130 may be used for communication among mobile devices (e.g., mobile device 120) themselves (intrapersonal communication) or for connecting to a higher-level network (e.g., the Internet). A wireless personal area network ("WPAN") may be considered a private network carried over wireless network technologies such as Bluetooth® or peer-to-peer communications over a wireless LAN (Note: the term "Bluetooth" is a registered trademark of Bluetooth SIG, Inc. and may be subject to trademark rights in various jurisdictions throughout the world and are used here only in reference to the products or services properly denominated by the marks to the extent that such trademark rights may exist). In embodiments of the present invention, mobile device 120 may have the necessary hardware to allow for communication over any preconfigured type of private network used for communication between them (e.g., a Bluetooth radio), and/or the Internet at large. In an embodiment, (not shown in environment 100) more than one private network may be implemented within location 130, for example, each zone may contain its own private network.

Additionally and/or alternatively, the various zones (Zone 1 134A, Zone 2 134B, through zone n 134*n*) of location 130 are not limited to being defined by set walls, and/or routers. For example, a zone may be defined via any known mediums in the art, including but not limited to, acoustic mediums, and optical mediums, such as, visible or infrared light or ultrasound. For example, for dynamic user program 142 to derive the exact zone within location 130 mobile device is in, data exchanged between mobile device 120, may be transmitted via infrared data links using well known technologies, such as infrared transceivers included in some mobile device models.

In the exemplary embodiment, server 140 is a server computer. Server 140 can be desktop computers, laptop computers, specialized computer servers, or any other computer system known in the art. In certain embodiments, server 140 represents computer systems utilizing clustered computers and components to act as a single pool of seamless resources when accessed through network 110. For example, such embodiments may be used in data center, cloud computing, storage area network (SAN), and network attached storage (NAS) applications. In certain embodiments Server 140 represent virtual machines. In other embodiments, server 140 may be a management server, a web server or any other electronic device capable of receiving and sending data. In another embodiment, server 140 may represent a server computing system utilizing multiple computers as a server system, such as in a cloud computing environment. In general, server 140 is representative of any electronic devices, or combination of electronic devices, capable of executing machine-readable program instructions, as described in greater detail with regard to FIG. 4. Server 140 contains dynamic user program 142, and information repository 144.

In the various embodiments of the present invention, dynamic user program 142 receives various data, for example geographical location of a user, and determines how provide the most pertinent and application action and/or information for the user corresponding to the detected received data. While depicted on server 140, in the exemplary embodiment, dynamic user program 142 may be located on mobile device 120, and/or retail location 130.

In an embodiment, dynamic user program 142, may utilize various location based technologies, and determine a specific action to initiate with upon a being engaged. For example, mobile device 120 using location tracking technology and gesture recognition (through the user of sensor 122 or a user interface through I/O 124) to trigger context aware and location aware help. For example, if mobile device 120 is in a store, dynamic user program 142 may display a store director and/or notify a sales person to help user. For another example, if mobile device 120 is traveling, dynamic user program 142 may provide user instructions from ones current location to a specific location. In this scenario, the specific location may be generated based on a derived pattern (e.g., on Monday at 4:30 pm user always goes to gym), or via information saved on mobile device 120 (e.g., a calendar entry of an appointment).

Through various components, dynamic user program 142 may detect mobile device 120. Additionally, dynamic user program 142, through sensor 122 and/or I/O 124, may commence and a specific action and/or display pertinent information to the user, without the user specifying the specific action dynamic user program 142 is to undertake. For example, when sensor 122 detects a gesture, dynamic user program 142 may determine a first type of location based assistance. In another example, if sensor 122 detects a different gesture, dynamic user program 142 may determine a different type of location based assistance. Therefore, dynamic user program 142 may determine a different location based assistance, depending on the location of mobile device coupled with the specific gesture received.

Exemplary location based assistance may range from a variety of different situations. For example, dynamic user program 142 location based assistance may provide a user with the wait time and/or a menu while in the waiting room of a restaurant. If a user is in the dining room, dynamic user program 142 location based assistance may send a notification to the waiter to attend the user. Additionally and/or alternatively, if a user is in the dining room, dynamic user program 142 location based assistance may allow the user to automatically place an order without the user having to specify what on the menu they want, based on a previous history via a derived pattern. Additionally and/or alternatively, if a user is in the dining room, dynamic user program 142 location based assistance may display, on I/O 124 to the user, the additional information to the user such as ingredients and calories of the menu items. If dynamic user program 142 location based assistance receives an indication and determines mobile device 120 is in the restroom of the restaurant, the system may alert the cleaning crew that the bathroom needs to be cleaned. Dynamic user program 142 may be associated with the computing system of the restaurant thereby allowing the dynamic user program 142 to send a notification to the waiter.

Dynamic user program 142 may also be configured with one or more application program interface ("API"), to connect to various computing systems/utilities within location 130. As used herein an API generally refers to a set of routines, protocols and/or tools for building software applications. Stated differently an API specifies how software components are to interact.

For example, dynamic user program 142 may invoke an API provided by a third system (not shown in environment 100) within the location 130 to request a sales representative, hostess, waiter, sales clerk, etc., to assist user. Further, depending on where mobile device 120 is located in location 130, the API may be directed at different functions based on the predictive determination. For instance, if user is at a retail shop, looking at merchandise, dynamic user program 142, through an API may notify a sales associate to assist user. If the same user at the retail shop is at the cashier desk, dynamic user program 142, through an API may notify a cashier to assist user. If the same user at the retail shop is in the fitting room, dynamic user program 142, through an API may notify a sales clerk to assist user in finding a different item to try on. In another instance, if a user is at a restaurant, dynamic user program 142, through an API may notify the waiter that user request the waiter's attendance.

In another embodiment, dynamic user program 142, utilizing user interface of mobile device 120 may allow a user to establish rules on when to initiate the determination as to what action to take. For example, a user may have two or more different methods of engaging dynamic user program 142. In this scenario, if user clicks an icon engaging dynamic user program 142 on user interface, a first action and/or output might occur, depending on user's location. Similarly, if user draws a symbol on I/O 124, as a different method to engage dynamic user program 142, a second action might occur. Under this example, the various triggers to engage dynamic user program 142 may direct dynamic user program 142 of a particular action to perform.

In another example, dynamic user program 142 location based assistance may provide a user with a map of a shopping mall allowing a user to locate their favorite store. Alternatively, and/or additionally, based on a derived pattern, dynamic user program 142 location based assistance may provide a user with directions from their current location to their favorite store.

In another example, dynamic user program 142 may utilize additional information from users mobile device, (e.g., calendar entries, email, etc.) to determine a specific location based assistance to provide for the user. For example, location 130 is an airport, and zone 134A is his current location and zone 2 134B is the gate of departure. In this scenario, mobile device 120 may search through users email, discover the flight number, and look up the correct terminal and gate the plane departs from, then the location based assistance of dynamic user program 142 may direct user to the appropriate location and/or provide a list of restaurants, restrooms, and/or stores in route.

In another example, dynamic user program 142 may derive a common pattern of use of the user. For example, dynamic user program 142 may identify a pattern if user always goes to the same retail shops at a mall. Thereafter, when dynamic user program 142 identifies user is at the mall, dynamic user program 142 may provide a user with directions from ones current location to a store that the user needs to go to base on a set of received information. Further, dynamic user program 142 may provide a notification to the user (via a user interface) informing user of a sale at a store the user typically goes to, and/or a sale at a store similar to one the user typically goes to.

Dynamic user program 142 may have distinct characteristics. Dynamic user program 142 may comprise separate instances installed across multiple devices. The separate instances can include distinct characteristics depending on location (e.g., physical or otherwise). For example, dynamic user program 142 may have a store owner side and a user side. The store owner side may be referred to as the server side (e.g., dynamic user program 142 may be located on server 140) and the user side may be referred to as a user interface side (e.g., dynamic user program 142 may be located on mobile device 120). The store owner may establish and define one or more zones within the location. The store owner may define and establish zero, one or more actions that correspond to each zone. The user interface size may allow a user to define one or more gestures to be associated with a specific action. For example, if a user draws a 'question mark' on the user interface via I/O/ 124 (regardless of whether the display is engaged and/or in an active state), a pre-programmed action may prompt user to "ask a question". Upon mobile device 120 recognizing a specific, pre-defined, gesture, dynamic user program 142 retrieves the associated action corresponding to the gesture. Based on the location of user (assuming mobile device 120 is in the general location as user) dynamic user program 142 will provide context aware actions and location based assistance. Context aware actions may comprise a variety of actions dynamic user program 142 may perform based on user's location and/or method of requesting said action. For example, if a user draws a 'question mark' while on a university campus, dynamic user program 142 will provide him with context aware information which, for example, may include: (i) a directory for new students curated by the university that includes maps and information about the opening hours of important places e.g., library health center, gym, tutoring center, cafeteria, etc.; (ii) an option to discover well reviewed restaurants nearby; (iii) an option to discover things to do nearby; (iv) a general map application; (v) names of the local species of flora and fauna in the area; (vi) travel time to a particular building, based on one's current location and mode of transportation; (vii) call security for help, and the like.

In an embodiment, dynamic user program 142 may be associated with a specific commercial/retail/education location. Thereby dynamic user program 142 may provide user with specific information pertinent to the location user is at. Such information may overrule the basic rules created by user. For example, a commercial establishment may have dynamic user program 142 provide information to a user (via mobile device 120) such as, specials, promotions, sales, loyalty programs etc. Thus, this may allow an owner of an establishment to control push certain merchandise, information, food, etc. For example, if user is in a retail store, as user enters zone 1 134A, dynamic user program 142 may inform user of a sale of a particular item located within zone 1; and as user enters zone 2 134B, dynamic user program 142 may inform user of a sale of a particular item located within zone 2, etc.

Information repository 144 may include any suitable volatile or non-volatile computer readable storage media, and may include random access memory (RAM) and cache memory (not depicted in FIG. 1). Dynamic user program 142 may be stored in a persistent storage component (not depicted) for execution and/or access by one or more of processor(s) via one or more memories (for more detail refer to FIG. 4). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Information repository 144 can be implemented using any architecture known in the art such as, for example, a relational database, an object-oriented database, and/or one or more tables. Information repository 144 stores actual, modeled, predicted, or otherwise derived patterns of movement based on sensor data. For example, information repository 144 stores all information received from mobile device 120. Information repository 144 may contain lookup tables, databases, charts, graphs, functions, equations, and the like that dynamic user program 142 may access to both maintain a specific parameter as well as manipulate various parameters within the various zones of location 130 (e.g., Zone 1 134A, Zone 2 134B, through zone n 134n). Information stored in information repository 144 may include: various geographical locations, specific actions linked to a various location 130, specific actions linked to each zone 134A through zone 134n, various user patterns, and the like.

Information repository 144 stores actual, modeled, predicted, or otherwise derived patterns based on sensor 122. For example, information repository 144 may contain lookup tables, databases, charts, graphs, functions, equations, and the like that dynamic user program 142 may access to both determine a specific action to take based on location of mobile device 120 and/or received gesture of from a user of mobile device 120. Information stored in information repository 144 may include: various gestures or movements, specific actions linked to the various gestures, dictating what data should be transmitted, as well as the data itself.

While depicted on server 140, in the exemplary embodiment, information repository 144 may be on a remote server or a "cloud" of computers interconnected by one or more networks utilizing clustered computers and components to act as a single pool of seamless resources, accessible to dynamic user program 142 and/or mobile device 120 via network 110.

Figure 2:
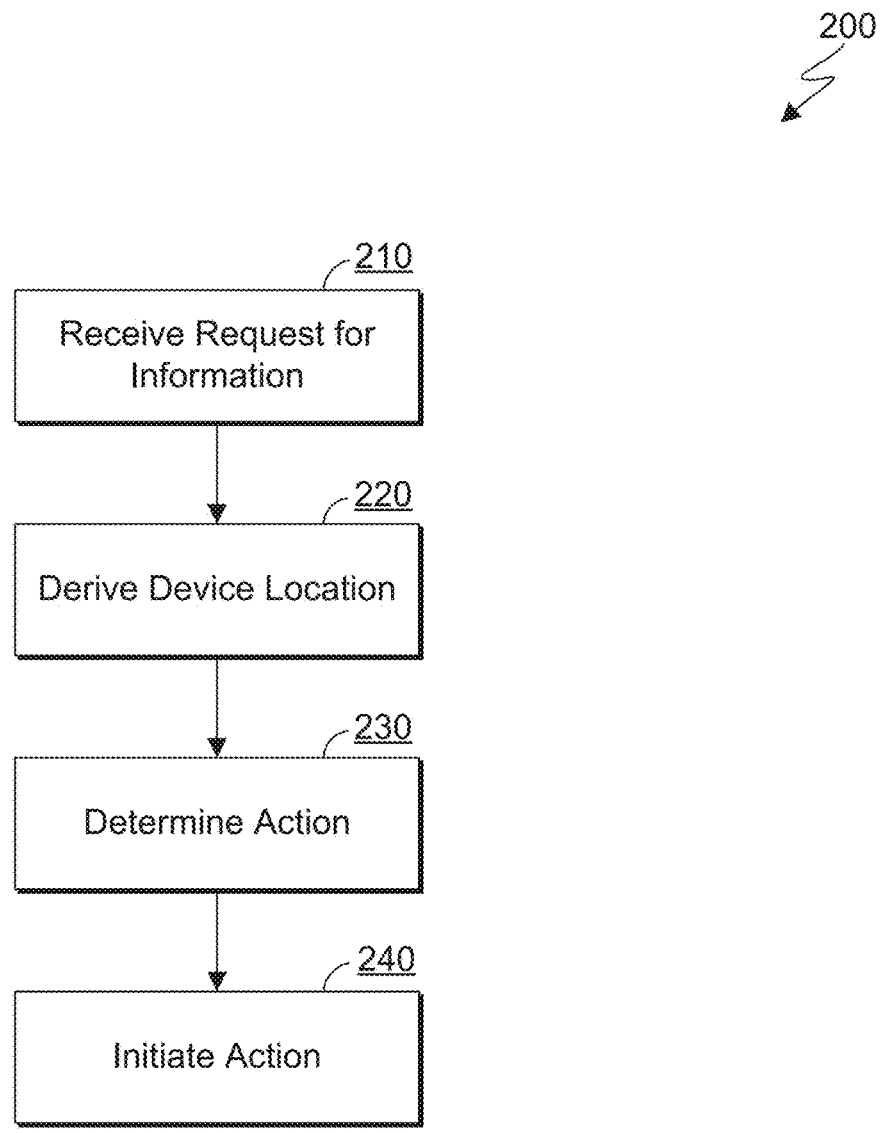
FIG. 2 is a flow chart illustrating operational steps for determining pertinent information for a user, in accordance with an embodiment of the present invention.

Reference is now made to FIG. 2. FIG. 2 is flowchart 200 depicting operational steps of dynamic user program 142 for detecting and transmitting data to and from mobile device 120, in accordance with an embodiment of the present invention.

In step 210 dynamic user program 142, receives a request for information. In an embodiment, dynamic user program 142 can receives a request for information based at least in part on a user's location, and/or a user's input through a user interface. In other embodiments, dynamic user program 142 can receive a request for information from one or more other components of environment 100. Regardless, dynamic user program 142 is initiated upon a receiving a request from mobile device 120.

It is noted that a dynamic user program 142 may allow a plethora of particular actions on mobile device to initiate the program. Alternatively, and/or additionally, a user may define a particular action(s) to commence dynamic user program 142. For example, particular actions may include, launching dynamic user program/function/application 142, inputting a particular symbol/character through I/O 124 on mobile device 120. For instance, if mobile device includes a touch screen, a user may draw is predetermined symbol which will sent the request for information, thereby initiating dynamic user program 142. A user may move device in a predetermined gesture, (which will be detected by movement sensor of sensor 122) which will send the request for information, thereby initiating dynamic user program 142.

In other embodiments, dynamic user program 142 may process step 210, through a geo-fence, and acted upon via mobile device 120, leaving and/or entering a new location. In this exemplary embodiment, it may allow an administrator of a commercial/retail location to push notifications and information to the user of mobile device 120.

In one exemplary scenario, dynamic user program 142 is continually sending and receiving information to mobile device 120, based on the location mobile device 120, regardless of a specific user input through I/O 124.

In an embodiment, dynamic user program 142 may learn a particular action to initiate step 210. For example, a user may perform a specific trigger which a certain type of action. Additionally, and or alternatively, dynamic user program 142 may provide different type of location assistance based on the type of request received. For instance, if the received request (of step 210) occurs when a user draws a question mark on the display of mobile device 120, dynamic user program 142 may receive a request to provide assistance dependent on a user's particular location, e.g., a map or directions. In another instance, if the received request (of step 210) occurs when a user may tap the display of mobile device 120, dynamic user program 142 may receive a request to dispatch help to user's location. It is noted that the type of help sent to user may be dependent on user's location (which is derived in step 220). In another instance, the received request may change based on the user of mobile device. For example, a first user may initiate dynamic user program 142 by using trigger A to initiate action Z, but a second user may initiate dynamic user program 142 by using trigger A to initiate action Y. Similarly, a first user may initiate dynamic user program 142 by using trigger A to initiate action Z, but a second user may initiate dynamic user program 142 by using trigger B to initiate action Z. The trigger such as trigger A and trigger B, refer to different methods a user may request information. Regardless of the trigger used to request information used, in step 210, dynamic user program 142 merely is concerned with receiving a request, not the method of how the request originated. Therefore, in dynamic user program 142 may receive multiple request types, each request specifying (or associated with) a unique trigger, specific to the user, in step 210. Stated differently, in an embodiment, when dynamic user program 142 in step 210 receives a request for information, each particular request may contain embedded information regarding the type of trigger action from a user's mobile device (e.g., mobile device 120). Such embedded information, in included may be utilized in step 230, discussed below, as dynamic user program 142 determine a specific action to perform.

In step 220 dynamic user program 142 derives the proximate location mobile device 120. The accuracy of deriving the location of mobile devices 120 may vary depending on each particular method of deriving a location. Additionally, the accuracy of deriving the location of mobile devices 120 may vary depending on the received type of information from step 210. In this embodiment, program 142 may derive a devices location based on a combination of location techniques. For example, program 142 can utilize GPS signals, Wi-Fi nodes, etc., to derive location.

In an embodiment, the accuracy of deriving mobile devices location may vary depending on location 130 and its associated zones. For example, as long as dynamic user program 142 can derive that mobile device 120 is located within a particular zone (e.g., zone 1 134A) then the exact accuracy is not necessary. In other embodiments, dynamic user program 142 may need a more accurate location of mobile device, if for instance, in step 210, the received request for information contained a specific request to send help. In another embodiment, if location 130 a certain number of large zones, then dynamic user program 142 may determine to provide a more accurate location rather than a mere proximity to a specific zone.

Dynamic user program 142 in step 220 may utilize a one or more methods to derive the location of mobile device 120. In an embodiment, when dynamic user program 142 receives a request for information (step 210) the request may include information providing the location of mobile device 120, as determined from sensor 122. For example, sensor 122 may include, but are not limited to, a location determining sensor (e.g., GPS), proximity sensors, light sensors, thermometers, heat sensors, atmospheric sensors, accelerometers, gyroscope, altimeter, barometer, compass, proximity sensors, motion detectors, touch sensors, or the like.

Dynamic user program 142 in step 220 may utilize various types of sensing techniques including, but not limited to processing of signals representing geographic locations in order to detect and/or infer one or more conditions under which dynamic user program 142 may determine pertinent information to display on mobile device 120 to user. For example, in step 220, dynamic user program 142 may process signals from a satellite positioning system, global positioning system, communication with a location server through a wireless communication network (e.g., Wi-Fi nodes, communication antenna, etc.), wireless communication triangulation techniques, etc. For instance, dynamic user program 142 may derive a devices location (per step 220) based on an identified IP address of a wireless connection. In an exemplary embodiment, dynamic user program 142 may utilize triangulation based on signal strength from various radio frequency signal within location 130, (e.g., a wireless internet from a router).

In step 230, dynamic user program 142 determines a specific action to perform. The specific action may depend on a plurality of different factors. Exemplary factors may comprise (i) location of mobile device 120; (ii) a determination of whether mobile device is traveling (e.g., is the user walking, running, driving, etc.); (iii) a determined pattern of use (e.g., purchase history, location history, etc.); (iv) any embedded data from step 210 (e.g., a specific action user performed to initiate dynamic user program 142); (v) rules established by the administrator of a location 130 where mobile device 120 is located; (vi) any rules established by the user; (vii) Internet of Things ('IoT') device information (e.g., a smart watch that has a heart monitor, blood pressure monitor, etc.); (viii) access to social media information to derive information (e.g., if a person's contact on social media discussed a topic relating to a person's location and/or made a suggestion social media); and the like.

Determining an action to perform may vary depending on the location of mobile device 120. Additionally, and/or alternatively a user may also be a factor that dynamic user program 142 must consider when determining an action to perform based on a user's preferences and/or a derived user pattern. For example, if user is in a restaurant (assuming location 130 is the restaurant), depending if user is in the waiting area (e.g., zone 1 134A); the dining room (e.g., zone 2 134B); the bar area (e.g., zone 3 134C); the restroom (e.g., zone 4 134D); etc. In this scenario, when user is in the waiting area (e.g., zone 1 134A), dynamic user program 142 may determine the action to be performed is to display on a mobile device of the user, a menu for the restaurant, the number of other parties ahead of user and/or alternatively the wait time. If user is in the dining room (e.g., zone 2

134B), dynamic user program 142 may determine to call the waiter and/or display the menu. If the user is in the bar area (e.g., zone 3 134C), dynamic user program 142 may determine to call the bar tender, automatically re-order a drink, display the bar special, etc. If user is in the restroom (e.g., zone 4 134D), dynamic user program 142 may determine call maintenance to clean the area. For another example, if user is in a shopping mall (assuming location 130 is the entire mall), depending if user is in a first store (e.g., zone 1 134A); a department store (e.g., zone 2 134B); the mall hallway (e.g., zone 3 134C); a second store (e.g., zone 4 134D); etc. Thus, depending on users location, dynamic user program 142 may determine the action to be is to notify a sales clerk in a specific store user is in, provide a user with a map of the area, provide the user automatically with directions to where it determines user may wish to go, etc. Regardless, it can be understood by those skilled in the art that mobile device 120, and subsequently a user associated with the device, may be located in a variety of locations all of which may alter what action dynamic user program 142 determines what action to perform.

For example, dynamic user program 142 in step 230 may determine to provide a map from users location to a specific store, upon deriving user is in the vicinity (per deriving device location of step 220) of a common store user often visits. Dynamic user program 142 may even access information about the store through social media or the internet, and identify that a store, in the vicinity of the users location, is having a sale, and in step 230 determine to notify the user of the sale and/or provide directions to the store.

Determining an action to perform may vary depending whether step 220 identified if mobile device 120 is traveling and if so at what speed and trajectory. For example, dynamic user program 142 may determine, the location user is traveling to, and provide a map and/or traffic alerts within the area, and redirect user to a quicker route. An embodiment of the present invention may determine a pattern of use of users travels (e.g., home, work, common errands, school, etc.), and be able to derive from and/or where the user is traveling and then provide assistance to avoid traffic, in route.

Determining an action to perform may further vary depending on received data, from step 210, from mobile device. For example, if dynamic user program 142 has two or more predefined methods to request information (per step 210), then each predefined methods to request information may request specific types of information. For instance, if the first predefined request, may trigger a first action, and a second predefined request may trigger a second action. In an embodiment, each predefined request may be user specific. For instance, if the first predefined request of a first user, may trigger a first action, and a second predefined of a first user request may trigger a second action, however if the first predefined request of a second user, may trigger the second action (of user one) action, and a second predefined of a second user one request may trigger a third action.

Determining an action to perform may vary depending any overruling rules established within the location itself. For example, a user and/or the administrator of a location, may create a set of rules which govern what action is to be performed based on a specific trigger. For example, if user is in a waiting area (e.g., zone 1 134A) of a restaurant (assuming location 130 is the restaurant), a specific trigger may display to user on mobile device 120 either the wait time or a menu. In another example, a different action might occur depending on if a user is at a store A (e.g., zone 1 134A) in a mall (location 130) versus a store B (e.g., zone 2 134B). Such differences might be dependent on either a set of rules established by either, a user and/or the administrator of a location (e.g., location 130 and/or each independent zone of sub-zone of location 130).

In step 240, dynamic user program 142 initiates the specified action, determined in step 230. In an embodiment, dynamic user program 142 may display a specific information on a display of mobile device 120, through I/O 124. In another embodiment, dynamic user program 142 may notify a $3^{rd}$ device associated with another second user to perform a specific action (e.g., notify a waiter to visit a table associated with the user of mobile device 120).

Figure 3A:
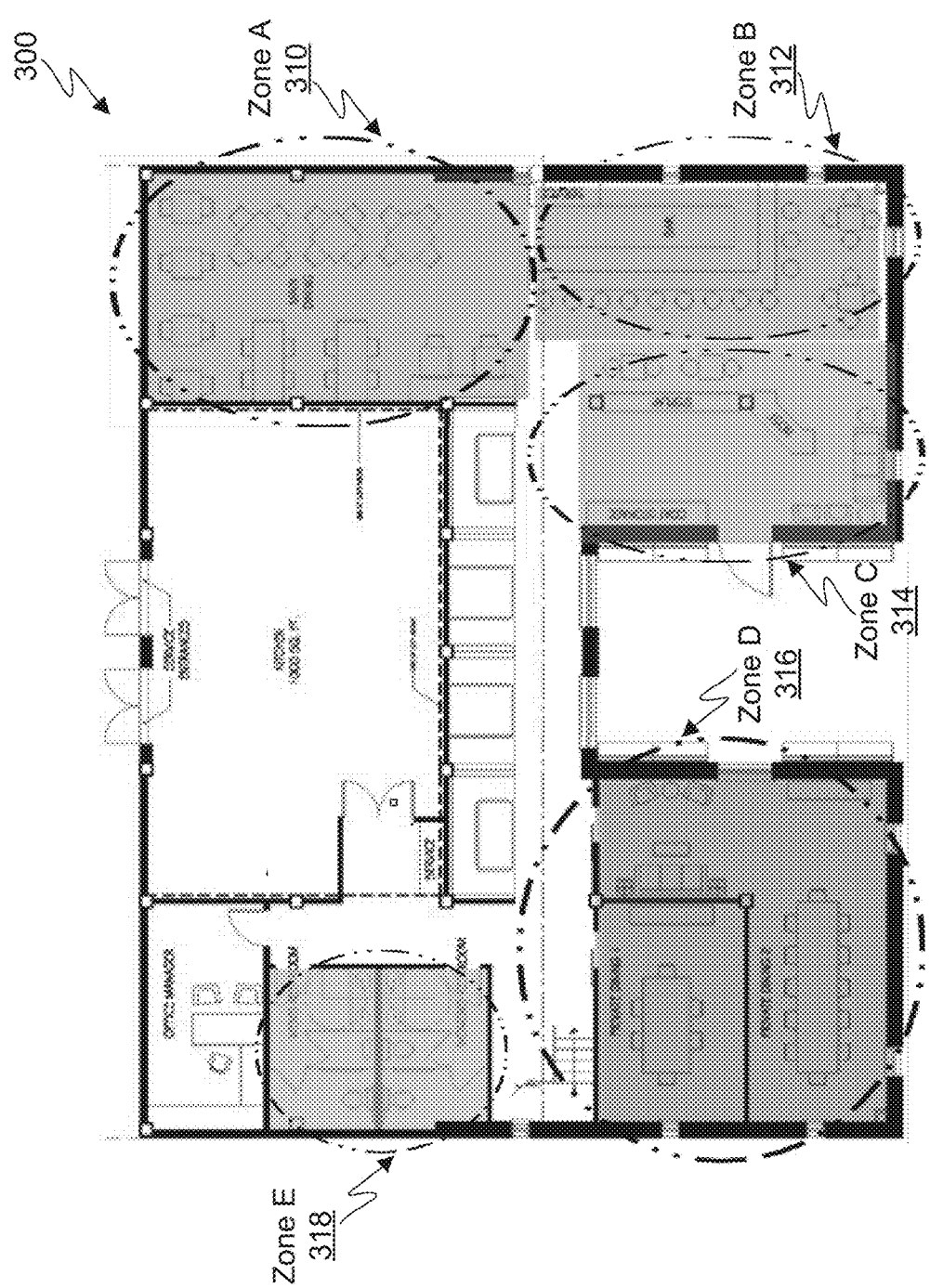
FIG. 3A is a diagram depicting an exemplary restaurant with a set of zones within the establishment, in accordance with an embodiment of the present invention.
Figure 3C:
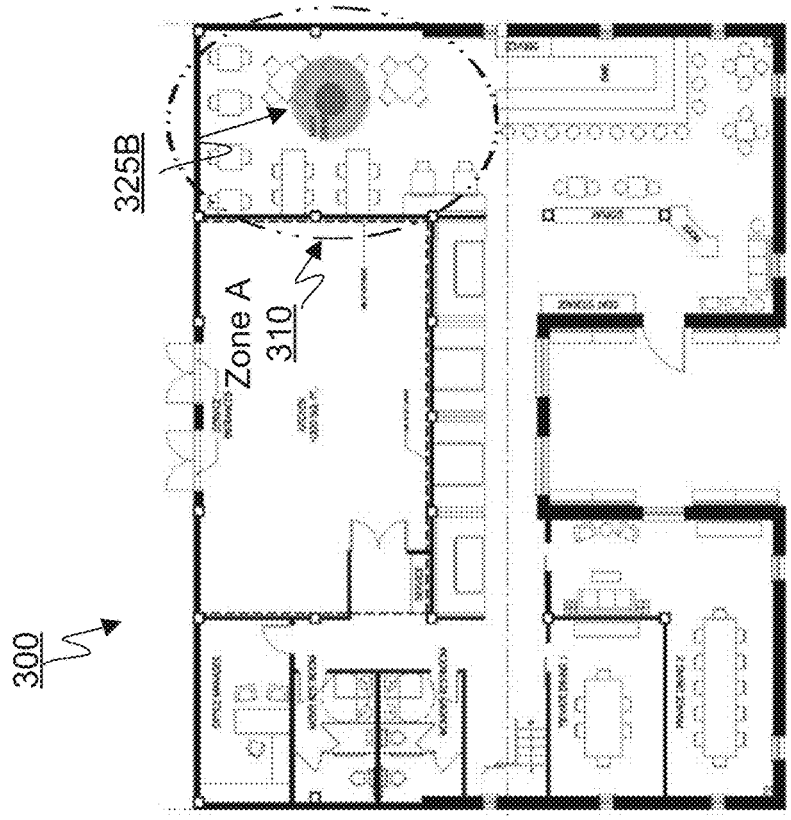
FIGS. 3B and 3C is a diagram depicting a user in various zones within the exemplary restaurant of FIG. 3A, in accordance with an embodiment of the present invention.
Figure 3B:
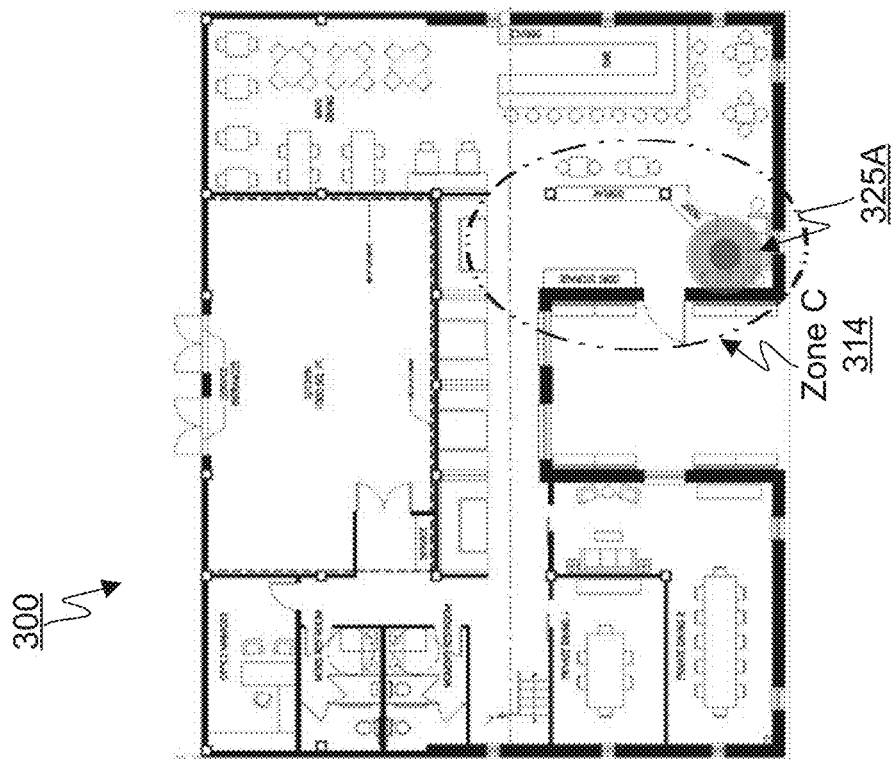

Reference is now made to FIGS. 3A, 3B and 3C. FIGS. 3A, 3B and 3C represent an exemplary restaurant 300. Specifically, FIG. 3A is a diagram depicting a restaurant 300 with a set of zones (Zone A 310A, Zone B 312, Zone C 314, Zone D 316, and Zone E 318) within the establishment. FIGS. 3B and 3C depict a user in the various zones of FIG. 3A, in accordance with an embodiment of the present invention.

FIG. 3A depicts restaurant 300 with five zones as established by an administrator dynamic user program 142 associated with the restaurant. Dynamic user program 142 may be located locally within restaurant 300, a remotely located server, on a cloud or on any device known in the art. Regardless of where dynamic user program 142 is located, restaurant 300 comprises five zones in which a user may be located. Zone A 310 of restaurant 300 is the main dining room. Zone B 312 of restaurant 300 is the bar. Zone C 314 of restaurant 300 is where the hostess may be located and designated as the entrance/waiting area. Zone D 316 of restaurant 300 has two private dining rooms. Zone D 316, may be subdivided into two zones where each subzone represents a private dining room. Zone E 318 of restaurant 300 is the men's and woman's restrooms. Zone E 318, may be subdivided into two zones where each subzone represents a single restroom. It is noted that each zone is presented for exemplary purposes only, and any number of zones may be implemented by those skilled in the art.

FIG. 3B depicts dynamic user program 142 deriving the proximate location 325A of mobile device 120 responsive to step 220 in restaurant 300. Specifically, dynamic user program 142 locates mobile device 120, associated with user in waiting area Zone C 314 of restaurant 300, responsive to receiving a request for information, per step 210 of dynamic user program 142 (not shown). Once dynamic user program 142 locates user 325A, the program determines an action to perform. Based on a set of rules by the administrator, or the user, a derived pattern of the administrator or the user, the trigger user used to request information, dynamic user program 142 may perform a specific action. Exemplary specific actions may comprise: (i) provide user 325A the proximate wait time; (ii) based on the current time, the number of parties ahead of user 325A; (iii) display on mobile device 120 a menu to user 325A; (iv) display on mobile device 120 a list of specials; (v) call the hostess to user, thereby allowing user to ask a question or order a drink while waiting; etc.

FIG. 3C depicts dynamic user program 142 deriving the proximate location 325B of mobile device 120 responsive to step 220 in restaurant 300. Specifically, dynamic user program 142 locates mobile device 120, associated with user 325B in the dining room, Zone A 310, of restaurant 300, responsive to receiving a request for information, per step 210 of dynamic user program 142 (not shown). Once dynamic user program 142 locates user 325B, the program decides on an action to perform. Based on a set of rules by the administrator, or the user, a derived pattern of the administrator or the user, the trigger user used to request information, dynamic user program 142 may perform a specific action. Exemplary specific actions may comprise: (i) display menu; (ii) calling the waiter to user; (iii) automatically requesting a drink refill; etc.

In an exemplary embodiment, user 325A and user 325B may be the same user at different time periods. In this scenario, depending on the user's location, different actions might occur for the same request for information (per step 210). Alternatively, depending on the user's location, similar actions might occur for the same request for information (per step 210).

In an exemplary embodiment, user 325A and user 325B may be different users at the same time period. In this scenario, depending on the user's location, different actions might occur for the same request for information (per step 210). Alternatively, depending on the user's location, similar actions might occur for the same request for information (per step 210).

Figure 4:
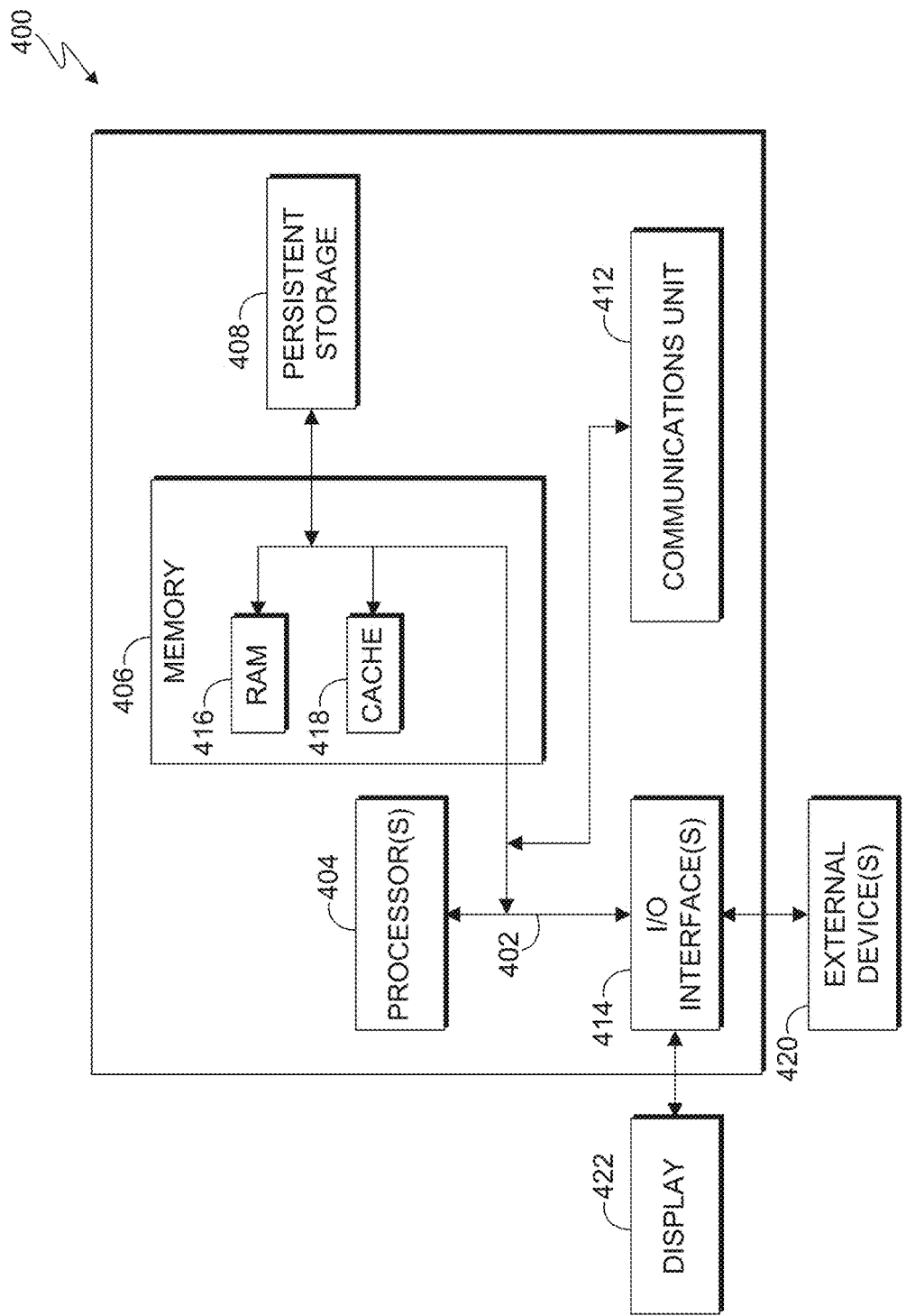
FIG. 4 is a block diagram of the internal and external components of a computer system, in accordance with an embodiment of the present invention.

Reference is now made to FIG. 4. FIG. 4 is a block diagram of internal and external components of a computer system 400, which is representative of the computer systems of FIG. 1, in accordance with an embodiment of the present invention. It should be appreciated that FIG. 4 provides only an illustration of one implementation, and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded to computer system 400 through communications unit 412 (e.g., via the Internet, a local area network, or other wide area network). From communications unit 412, the software and data may be loaded to persistent storage 408.

I/O interface(s) 414 allows for input and output of data with other devices that may be connected to computer system 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, a specific trigger based at least in part on a location of a computing device and contextual factors, wherein the contextual factors include at least usage patterns and saved information, by:
        deriving the usage pattern, based on the saved information, reoccurring events, and a set of parameters, wherein the usage pattern is based in part on analyzing, by one or more processors, the set of parameters to find matches between the location of the computing device, the reoccurring events, and the saved information, and
        assigning a specific action to perform, based in part on the derived usage pattern and the location of the computing device;
    determining, by one or more processors, an action to perform based on the location the computing device is located within, a set of rules, the identified contextual factors, and the identified specific trigger; and
    performing, by one or more processors, the determined action based on the contextual factors after detecting an instance of the specific trigger, wherein the determined action comprises at least one of the following:
    displaying a set of information on the computing device;
    displaying directions on a map; and
    transmitting a notification to a second computing device.

2. The method of claim 1, further comprising:
    deriving, by one or more processors, a first position of the computing device within a location, wherein:
    the location comprises, of a plurality of zones, and wherein deriving, the location of the computing device, comprises:
receiving, by one or more processors, information from the computing device; and
determining, by one or more processors, the proximate location of the computing device, within the location.

3. The method of claim 1, wherein the set of parameters are based, at least in part, on
a day;
a date;
a time;
a location;
a set of information received within the received request;
a set of rules; and
a derived zone within the location.

4. The method of claim 1, wherein each the locations comprises at least one of the following:
a residence;
a retail store;
a restaurant;
a industrial building;
a shopping center;
a place of work; or
a geographical location while traveling.

5. The method of claim 1, further comprising:
receiving, by one or more processors, a set of data from the place wherein the set of data comprises a predetermined set of actions dependent on the location of the computing device.

6. The method of claim 1, further comprising:
matching, by one or more processors, the specific trigger to a pre-designated requests.

7. The method of claim 1, further comprising determining the location of the computing device as one of the identified contextual factors.

8. The method of claim 1, wherein the location of the computing device is identified by the position of the computing device in a particular zone of a building.

9. The method of claim 1, wherein the location of the computing is determined using at least at least one of the following:
a GPS unit;
a geo-fence;
an Internet Protocol address (IP Address);
a set of proximity sensors;
a set of light sensors;
a thermometer;
an atmospheric sensor;
an accelerometer; and
a gyroscope.

10. A computer program product comprising:
one or more processors which perform program instructions;
a computer readable storage medium on a computing device and the program instructions stored on the computer readable storage medium, the program instructions comprising:
program instructions to identify a specific trigger based at least in part on a location of the computing device and contextual factors, wherein the contextual factors include at least usage patterns and saved information, by:
program instructions to derive the usage pattern, based on the saved information, reoccurring events, and a set of parameters, wherein the common usage pattern is based in part on program to analyze the set of parameters to find matches between the location of the computing device, the reoccurring events, and the saved information, and
program instructions to assign a specific action to perform, based in part on the derived usage pattern, the reoccurring events, and the location of the computing device;
program instructions to determine an action to perform based on the location the computing device is located, a set of rules, the identified contextual factors, and the identified specific trigger; and
program instructions to perform the determined action based on the contextual factors after detecting an instance of the specific trigger, wherein the determined action comprises at least one of the following:
program instructions to display a set of information on the computing device;
program instructions to display directions on a map; and
program instructions to transmit a notification to a second computing device.

11. The computer program product of claim 10, wherein program instructions to identify the contextual factors, comprises:
program instructions to derive the usage pattern, based on the saved information, reoccurring events, and a set of parameters, wherein the common usage pattern is based in part on program to analyze the set of parameters to find matches between the location of the computing device, the reoccurring events, and the saved information; and
program instructions to assign a specific action to perform, based in part on the derived usage pattern, the reoccurring events, and the location of the computing device.

12. The computer program product of claim 10, further comprising:
program instructions to receive a set of data from the place wherein the set of data comprises a predetermined set of actions dependent on the location of the computing device.

13. The computer program product of claim 10, further comprising:
program instructions to match the specific trigger to a pre-designated requests.

14. The computer program product of claim 10, further comprising program instructions to determine the location of the computing device as one of the identified contextual factors.

15. A computer system comprising:
one or more computer processors;
one or more computer readable storage media;
program instructions stored on the one or more computer readable storage media for execution by at least one of the one or more processors, the program instructions comprising:
program instructions to identify a specific trigger based at least in part on a location of the computing device and contextual factors, wherein the contextual factors include at least derived usage patterns and saved information, by:
program instructions to derive the usage pattern, based on the saved information, reoccurring events, and a set of parameters, wherein the common usage pattern is based in part on program to analyze the set of parameters to find matches between the location of the computing device, the reoccurring events, and the saved information, and program instructions to assign a specific action to perform, based in part on the derived usage pattern, the reoccurring events, and the location of the computing device;

program instructions to determine an action to perform based on the zone the computing device is located, a set of rules, the identified contextual factors, and the identified specific trigger; and program instructions to perform the determined action based on the contextual factors after detecting an instance of the specific trigger, wherein the determined action comprises at least one of the following:

program instructions to display a set of information on the computing device;

program instructions to display directions on a map; and program instructions to transmit a notification to a second computing device.

16. The computer system of claim 15, further comprising:

program instructions to receive a set of data from the place wherein the set of data comprises a predetermined set of actions dependent on the location of the computing device.

17. The computer system of claim 15, further comprising:

program instructions to match the specific trigger to pre-designated requests.

18. The computer system of claim 15, further comprising:

program instructions to determine the location of the computing device as one of the identified contextual factors.

* * * * *